R. E. GALVIN & H. C. SCHUMACHER.
MACHINE FRAME.
APPLICATION FILED JAN. 5, 1918.
1,262,321.
Patented Apr. 9, 1918.
2 SHEETS—SHEET 2.
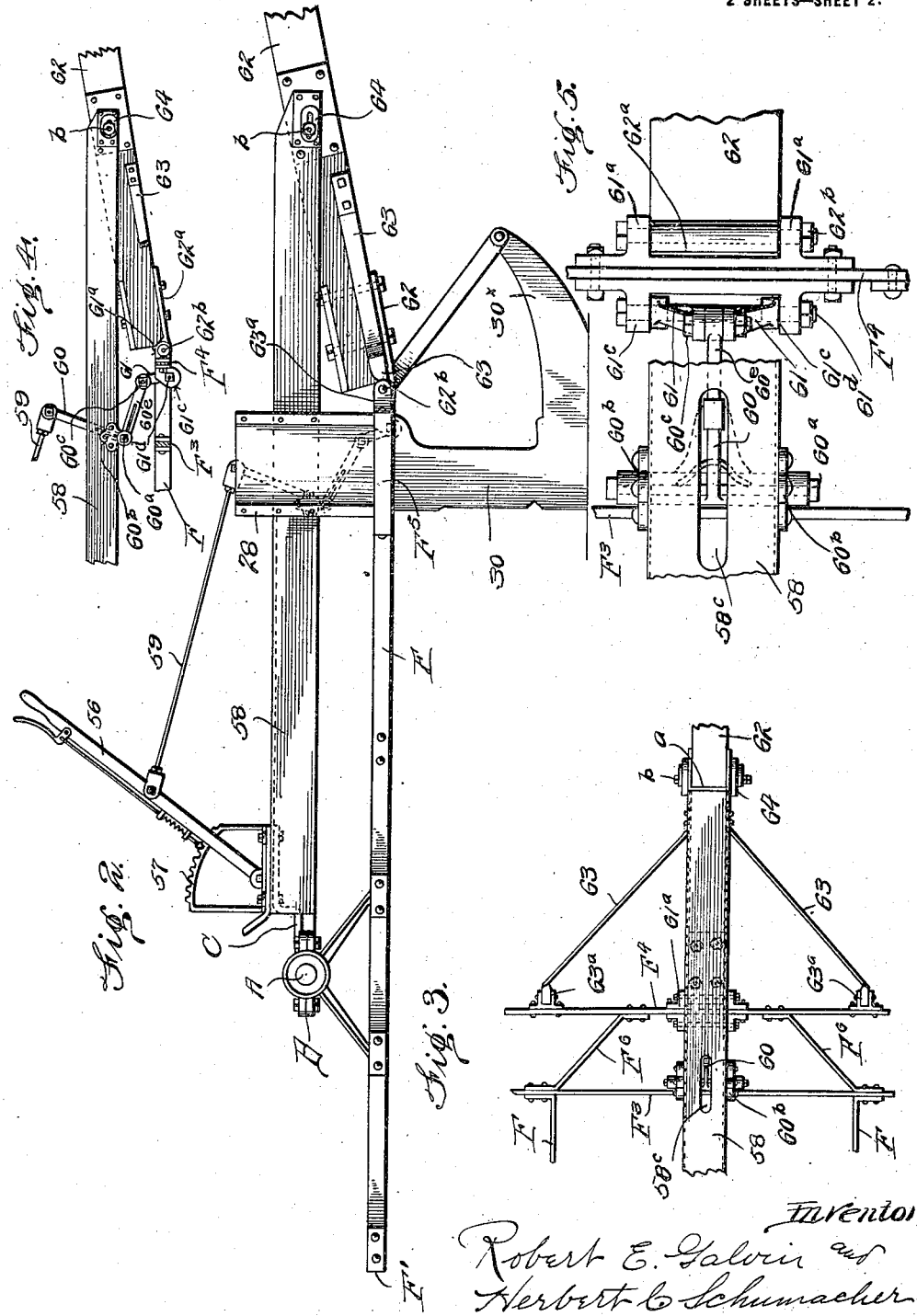

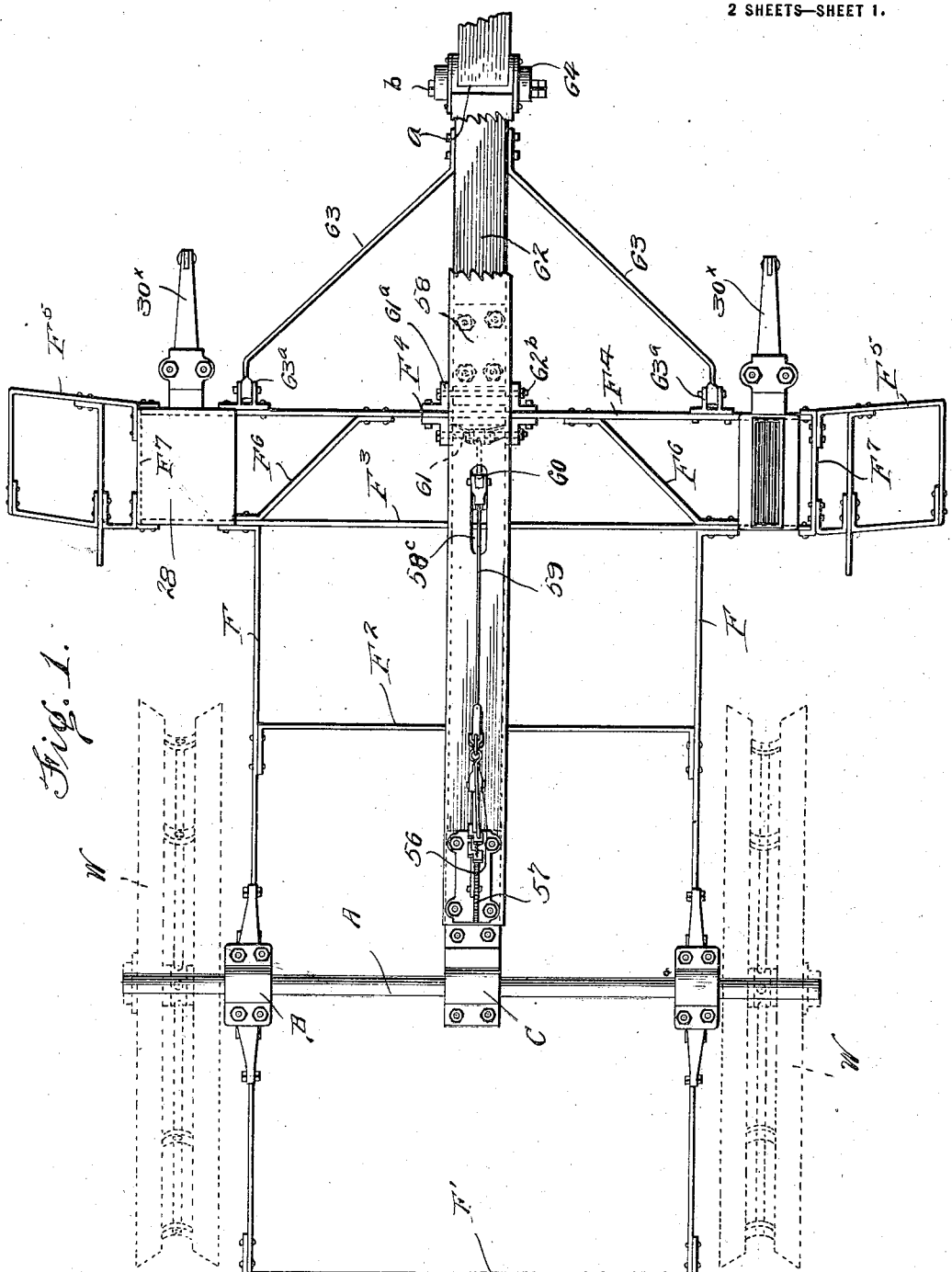

UNITED STATES PATENT OFFICE.

ROBERT E. GALVIN AND HERBERT C. SCHUMACHER, OF ROCK ISLAND, ILLINOIS.

MACHINE-FRAME.

1,262,321. Specification of Letters Patent. Patented Apr. 9, 1918.

Original application filed July 18, 1917, Serial No. 181,308. Divided and this application filed January 5, 1918. Serial No. 210,467.

*To all whom it may concern:*

Be it known that we, ROBERT E. GALVIN and HERBERT C. SCHUMACHER, citizens of the United States, residing at Rock Island, in the county of Rock Island and State of Illinois, have invented certain new and useful Improvements in Machine-Frames; and we hereby declare that the following is a full, clear, and exact description thereof, reference being had to the accompanying drawings, which form part of this specification.

This invention is a novel improvement in machine frames, especially designed for corn planters of the type shown in our application, Serial No. 181,308, filed July 18, 1917, of which this application is a division.

In the accompanying drawings we have illustrated a frame for a corn planter embodying the novel features of the invention, and which in connection with the accompanying description will enable others to adopt and use the same; but we do not consider the invention restricted to corn planters as the frame may be adapted for other agricultural implements and machines, and novel parts thereof employed in frames of various kinds. The essential features and novel combinations and constructions of parts for which protection is desired are therefore set forth in the appended claims.

In said drawings:

Figure 1 is a top plan view of the complete frame as adapted for a corn planter.

Fig. 2 is a side view of Fig. 1.

Fig. 3 is a detail top plan view of part of the connection between the steel tongue or backbone of the frame and the wooden or pivoted tongue.

Fig. 4 is a detail sectional view.

Fig. 5 is an enlarged detail view showing the hinged connections of the backbone 58 and of the tongue 62 to the frame.

The major parts of the main frame are preferably made of flat bar iron or steel arranged edgewise, and said frame, as shown, comprises opposite side members F connected by a rear transverse bar F', a front transverse bar $F^3$, and an intermediate bar $F^2$, all said bars being securely united preferably by bolts.

In front of and parallel with bar $F^3$ is a similar bar $F^4$ which projects beyond the side bars F; and the bars $F^3$, $F^4$ are connected by end bars $F^7$; and by intermediate angularly disposed brace bars $F^6$ preferably bolted thereto.

This frame is shown as supported upon a shaft or axle A journaled in boxes or bearings B bolted to the side members F intermediate the bars F', $F^2$.

The main tongue-member or backbone of the frame is preferably composed of an inverted U-bar 58, which is rigidly connected at its rear end to a member C sleeved on the axle A, and the driver's seat and the levers controlling the mechanism may be mounted upon this tongue-member 58.

Said tongue member lies above and projects beyond the bar $F^4$, and its front end is cut away as at $a$, and a tongue 62 is pivoted to the front end of said tongue-member 58 by means of a bolt $b$, which transfixes the side flanges of the channel bar 58, and castings 64 attached thereto, and pivots the tongue thereon.

The tongue 62 extends in rear of the pivot $b$ and is hingedly connected to the front bar $F^4$ of the frame by suitable means. As shown a plate $62^a$ is bolted to the rear end of the tongue and this plate is hinged on a bolt $62^b$ between brackets $61^a$ bolted to the bar $F^4$ (see Figs. 4 and 5).

Braces 63 are bolted to the tongue 62 and run back to and are pivotally connected with the front member $F^4$ of the frame, as at $63^a$.

The front part of the frame and the rear end of the tongue are adjustably connected with the tongue-member 58 by suitable means so that they may be vertically adjusted relatively to the tongue-member. As shown brackets $61^c$ are bolted to bar $F^4$ in rear of the brackets $61^a$ and the lower ends of links 61 are hingedly connected to the brackets $61^c$ by a bolt $61^d$. The other ends of the links are pivotally connected by a bolt $60^c$ to one arm $60^e$ of a bell crank lever which is pivoted at $60^a$ on brackets $60^b$ attached to the sides of the tongue member 58; and the other arm 60 of the said bell crank projects above the tongue member 58 through a slot $58^c$ therein.

The upper end of arm 60 is pivotally connected to one end of a link 59 the other end of which is connected to a hand lever 56 pivoted on a bracket attached to the rear end of the tongue-member 58 and adapted to be locked to a sector 57 in the usual manner. By adjusting lever 56 the front end of the main frame and the rear end of the tongue 62 can be raised or lowered relatively to the tongue-member 58 and thus the forward parts of the frame, in the example shown, may be raised or lowered and held in any adjusted position.

The inner end of the tongue being pivotally connected directly to the frame insures a direct pull on the frame near the runners 30.

Upon bars F³ and F⁴ near their outer ends may be mounted the seed boxes 28, which may be of any suitable construction; and to said bars to the outerside of boxes 28 may be attached approximately rectangular metallic frames F⁵ in which marking devices, not shown, can be mounted.

Runners 30 may be attached to the frame beneath the seed boxes 28 and provided with furrow openers 30* operating as usual. The axle A may be supported on wheels W, which may be of any suitable construction.

The furrow openers, seed droppers, and marking devices, etc., may be constructed and arranged to operate as set forth in our aforesaid application and therefore need no further explanation or illustration herein. The said mechanisms, however, may be of any desired construction as the novel frame forming the subject matter of this application is capable of use with many kinds of seeding, dropping and furrow opening devices, and various means for actuating same; and such frame may be utilized for other implements or mechanisms or vehicles.

What we claim is:

1. In combination, a frame, an axle, a tongue-member connected to the frame and projecting beyond the front thereof, a tongue hinged to the forward end of this tongue-member and means on the tongue-member connected with the forward end of the frame and the rear end of the tongue to raise or lower the rear end of the tongue and the front end of the frame relatively to the tongue-member.

2. In combination a frame, a tongue-member connected with the frame and projecting beyond the front end thereof, a tongue hingedly connected to the forward end of this tongue-member and extending in rear of the hinge; means hingedly connecting the rear end of the tongue to the front end of the frame, a lever pivoted on the tongue-member and connections between said lever and rear end of the tongue for shifting said lever.

3. In combination, a frame, an axle supporting said frame, a tongue-member hingedly connected with the frame and projecting beyond the front end thereof, a tongue hingedly connected to the forward end of said tongue-member and extending in rear of the hinge, means pivotally connecting the inner end of the tongue to the front end of the frame; and means for raising or lowering the rear end of the tongue and the front end of the frame relatively to the tongue-member.

4. In combination, a frame, an axle supporting said frame, a tongue-member hingedly connected to the frame and projecting beyond the front thereof, a tongue hinged to the forward end of this tongue-member and to the front end of the frame, a lever pivoted on the tongue-member, connections between said lever and the forward end of the frame and the rear end of the tongue to raise or lower the rear end of the tongue and the front end of the frame relatively to the tongue-member.

5. In combination a frame, an axle supporting said frame, a tongue-member hingedly connected with the frame and projecting beyond the front thereof, a tongue hingedly connected to the forward end of this tongue-member and projecting in rear of the hinge, means hingedly connecting the rear end of the tongue to the front end of the frame, a lever pivoted on the member, a link connection between said lever and rear end of the tongue and the front end of frame and means for shifting said lever.

6. In combination, a wheeled frame, an axle supporting said frame, a tongue-member connected to the axle and projecting beyond the front of the frame, a tongue hinged to the forward end of this tongue-member and to the front end of the frame, a lever pivoted on the tongue-member, connections between said lever and the forward end of the frame and the rear end of the tongue, and means for rocking said lever so as to raise or lower the rear end of the tongue and the front end of the frame relatively to the tongue-member.

7. In combination a frame having a centrally disposed tongue-member, an axle supporting said frame and the rear end of said tongue-member, a tongue having a hinge connection with the front end of said tongue-member in front of the frame, a hinge connection between the rear end of said tongue and the front end of the frame, a lever pivoted on the tongue-member, and connections between said lever and the front end of the frame and the rear end of the tongue for raising the front end of the frame and the rear end of the tongue relative to the tongue member, substantially as described.

8. In combination, a wheeled axle, a frame mounted on said axle and having a centrally disposed tongue-member connected with the axle at its rear end, a tongue having a hinge connection with the front end of said tongue-member in front of the frame, a hinge connection between the rear end of said tongue and the front end of the frame, braces hingedly connecting said tongue with the frame, a lever pivoted on the tongue-member, and connections between said lever and the front end of the frame and rear end of the tongue for raising the front end of the frame and rear end of tongue relative to the tongue-member, substantially as described.

9. A planter frame, comprising side bars, a rear connecting bar, a pair of parallel front bars spaced apart, and projecting beyond the side members, tie bars connecting the front bars, the projecting portions of said front bars being adapted for connection of furrow openers and support of seed boxes, a tongue-member disposed approximately centrally of the frame and hingedly connected at rear therewith and projecting beyond the front bars, a tongue hinged to the forward end of the tongue-member, and in rear of said hinge, and also hinged to the front bar of the frame, and means for raising or lowering the hinge joint between the tongue and frame relatively to the tongue-member, substantially as described.

10. A planter frame, comprising side bars, a rear connecting bar, a pair of parallel front bars spaced apart, and projecting beyond the side members, tie bars connecting the front bars, the projecting portions of said front bars being adapted for connection of furrow openers and support of seed boxes, with a wheeled axle supporting the frame, a tongue member disposed approximately centrally of the frame and connected at rear with the supporting axle and projecting beyond the front bars, a tongue hinged to the forward end of the tongue-member, and in rear of said hinge also hinged to the front bar of the frame, and means for raising or lowering the hinge joint between the tongue and frame relatively to the tongue-member, substantially as described.

In testimony that we claim the foregoing as our own, we affix our signatures.

ROBERT E. GALVIN.
HERBERT C. SCHUMACHER.

Copies of this patent may be obtained for five cents each, by addressing the "Commissioner of Patents, Washington, D. C."